(12) United States Patent
Eleftheriou et al.

(10) Patent No.: US 8,700,949 B2
(45) Date of Patent: Apr. 15, 2014

(54) RELIABILITY SCHEME USING HYBRID SSD/HDD REPLICATION WITH LOG STRUCTURED MANAGEMENT

(75) Inventors: Evangelos S. Eleftheriou, Rueschlikon (CH); Robert Haas, Adliswil (CH); Xiaoyu Hu, Horgen (CH); Roman A. Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/033,470

(22) Filed: Feb. 23, 2011

(65) Prior Publication Data

US 2011/0246821 A1  Oct. 6, 2011

(30) Foreign Application Priority Data

Mar. 30, 2010 (EP) .................................. 10158440

(51) Int. Cl.
*G06F 11/00* (2006.01)
(52) U.S. Cl.
USPC ............. 714/6.23; 714/6.1; 714/6.2; 711/113
(58) Field of Classification Search
USPC ............ 714/6.1, 6.2, 6.21, 6.22, 6.23, 15, 42; 711/103, 113, 114, 117, 118
See application file for complete search history.

(56) References Cited

U.S. PATENT DOCUMENTS

| | | | |
|---|---|---|---|
| 7,073,029 B2 | 7/2006 | Uysal et al. | |
| 7,159,086 B2 | 1/2007 | Bress et al. | |
| 7,318,118 B2 | 1/2008 | Chu et al. | |
| 2006/0004957 A1* | 1/2006 | Hand et al. | 711/113 |
| 2006/0080501 A1 | 4/2006 | Auerbach et al. | |
| 2006/0129373 A1 | 6/2006 | Georgis | |
| 2008/0059694 A1 | 3/2008 | Lee | |
| 2008/0177938 A1 | 7/2008 | Yu | |
| 2009/0109823 A1 | 4/2009 | Joukov | |
| 2009/0172335 A1 | 7/2009 | Kulkarni et al. | |
| 2009/0172466 A1* | 7/2009 | Royer et al. | 714/6 |
| 2009/0240881 A1 | 9/2009 | Halloush et al. | |
| 2010/0211731 A1* | 8/2010 | Mittendorff et al. | 711/113 |
| 2010/0281230 A1* | 11/2010 | Rabii et al. | 711/103 |
| 2010/0318734 A1* | 12/2010 | Vaid et al. | 711/113 |
| 2011/0035548 A1* | 2/2011 | Kimmel et al. | 711/114 |
| 2011/0153931 A1* | 6/2011 | Bell et al. | 711/114 |
| 2011/0202707 A1* | 8/2011 | Moon et al. | 711/103 |

FOREIGN PATENT DOCUMENTS

| | | |
|---|---|---|
| WO | 2007/133647 A2 | 11/2007 |
| WO | 2008/139447 A2 | 11/2008 |

OTHER PUBLICATIONS

Wang et al., "A Case for Redundant Arrays of Hybrid Disks (RAHD)," IEEE Transactions on Magnetics, vol. 44, No. 11, Nov. 2008, p. 3738-3741.
Soundararajan et al., "Extending SSD Lifetimes With Disk-Base Write Caches," Thursday, Feb. 25, 2010, p. 1-14.

* cited by examiner

*Primary Examiner* — Joseph D Manoskey
(74) *Attorney, Agent, or Firm* — Zilka-Kotab, PC

(57) ABSTRACT

In one embodiment, a method of storing data includes storing a first copy of data in a solid state memory and storing a second copy of the data in a hard disk drive memory substantially simultaneously with the storing the first copy. In another embodiment, a system for storing data includes a solid state memory, at least one hard disk drive memory, and a controller for controlling storage of data in the solid state memory and the hard disk drive memory. Other methods, systems, and computer program products are also described according to various embodiments.

20 Claims, 7 Drawing Sheets

US 8,700,949 B2

RELIABILITY SCHEME USING HYBRID SSD/HDD REPLICATION WITH LOG STRUCTURED MANAGEMENT

RELATED APPLICATIONS

The present application claims priority to a European Patent Application filed Mar. 30, 2010, under Appl. No. 10158440.7, which is incorporated herein by reference.

BACKGROUND

Information-handling systems may have different types of permanent storage devices. One information-handling system has a processor capable of processing information and of generating a storage task, a hard disk drive interface with a processor, the hard disk drive being capable of storing information on a rotating magnetic disk and of performing a storage task, a solid state drive interface with the processor, the solid state drive being capable of storing information in flash memory and of performing the storage task, and a storage arbitrator interface with a hard disk drive and the solid state drive, the storage arbitrator being capable of selecting one of the hard disk drives with a solid state drive to perform a predetermined task based on one or more factors. Furthermore, the information-handling system has a redundant array of independent disks (RAID) controller interfaced with a hard disk drive and a solid state drive. The RAID controller is capable of mirroring information stored on the hard disk drive and the solid state drive.

BRIEF SUMMARY

In one embodiment, a method of storing data includes storing a first copy of data in a solid state memory and storing a second copy of the data in a hard disk drive memory substantially simultaneously with the storing the first copy.

In another embodiment, a system for storing data includes a solid state memory, at least one hard disk drive memory, and a controller for controlling storage of data in the solid state memory and the hard disk drive memory, wherein a first copy of the data is stored in the solid state memory substantially simultaneously with storing a second copy of the data in the at least one hard disk drive memory.

In another embodiment, a computer program product for storing data on a data storage system includes a computer readable storage medium having computer readable program code embodied therewith. The computer readable program code includes computer readable program code configured to store a first copy of data in a solid state memory, and computer readable program code configured to store a second copy of the data in a hard disk drive memory substantially simultaneously with the storing the first copy.

Other aspects and embodiments of the present invention will become apparent from the following detailed description, which, when taken in conjunction with the drawings, illustrate by way of example the principles of the invention.

DETAILED DESCRIPTION

Figure 1:
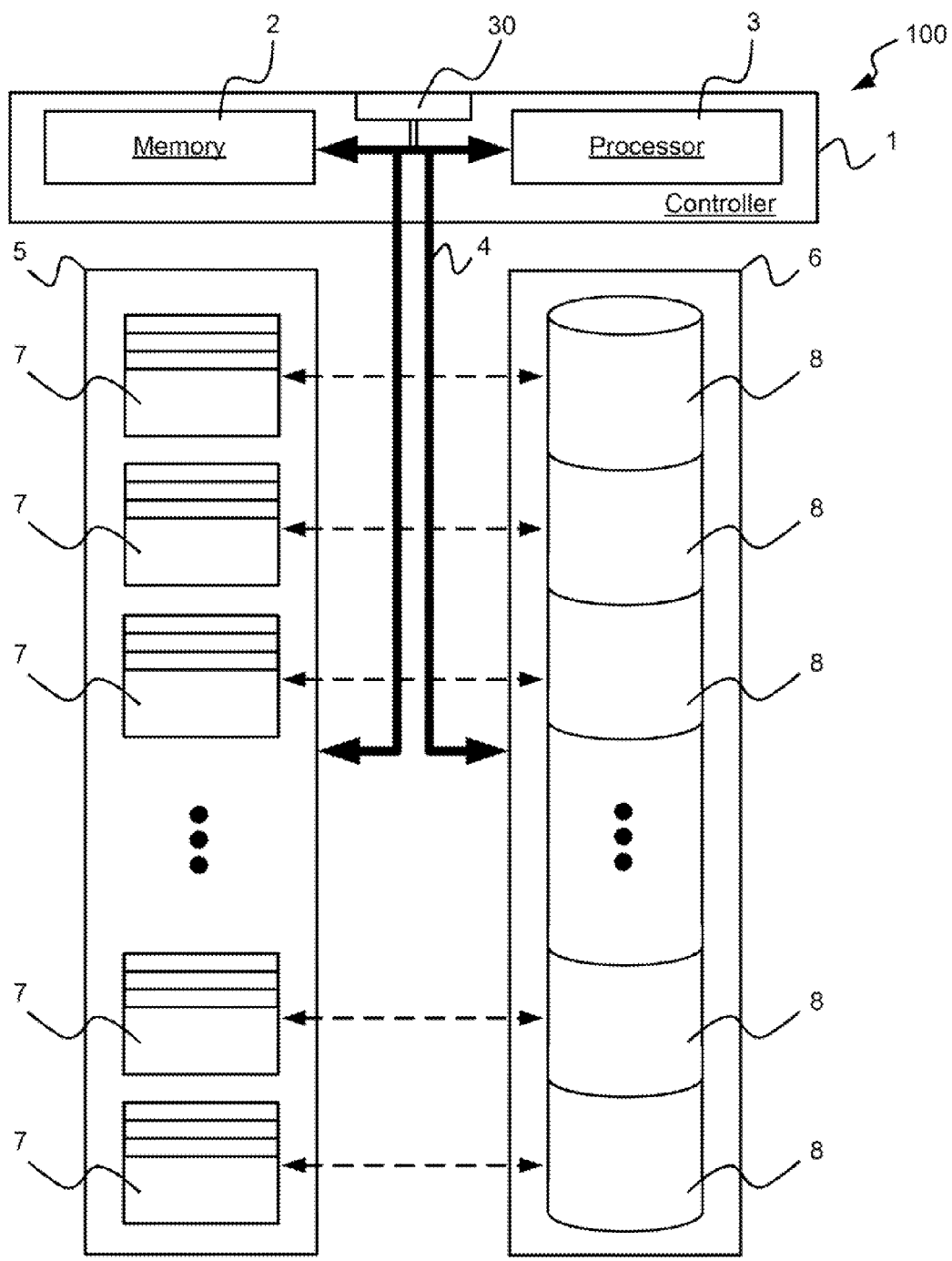
FIG. 1 depicts a first embodiment of a data storage system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method of storing data includes storing a first copy of data in a solid state memory and storing a second copy of the data in a hard disk drive memory substantially simultaneously with the storing the first copy.

In another general embodiment, a system for storing data includes a solid state memory, at least one hard disk drive memory, and a controller for controlling storage of data in the solid state memory and the hard disk drive memory, wherein a first copy of the data is stored in the solid state memory substantially simultaneously with storing a second copy of the data in the at least one hard disk drive memory.

In another general embodiment, a computer program product for storing data on a data storage system includes a computer readable storage medium having computer readable program code embodied therewith. The computer readable program code includes computer readable program code configured to store a first copy of data in a solid state memory, and computer readable program code configured to store a second copy of the data in a hard disk drive memory substantially simultaneously with the storing the first copy.

In one embodiment, a method of storing data using a solid state memory and a hard disk drive (HDD) uses a controller which controls the storing of the data in the solid state memory and in the HDD. The method is capable of providing a cost-effective yet high-performing replication-based reliability scheme for solid state memory, e.g., flash memory.

In another embodiment, a system uses one or more HDDs to store a replicated copy for data stored on the solid state memory. The replicated data on the HDD is managed by the same controller that controls data on the solid state memory. In a further embodiment, data on the HDD are managed in the same way as data on the solid state memory.

According to another embodiment, all read-requests are served by solid state memory and all write-requests are served by either of the solid state memory and/or the HDD. In a further embodiment, the write requests are served by the solid state memory and the HDD, simultaneously.

In some approaches, physical blocks of solid state memory may be virtually associated with logical or physical segments of the HDD. In this way, the proposed system is cost-effective and provides a high data-throughput.

Another embodiment refers to a method of storing data, whereby the data is written simultaneously to the solid state memory and the HDD, or first to the solid state memory and then to the HDD. This method provides for fast storing of the data by replicating the data using HDD.

In another approach, a block of the solid state memory is accessed and the same data is written in an associated corresponding disk segment of HDD.

Another embodiment includes a method of storing data, wherein the method refers to reading data only from the solid state memory and not from the HDD. The HDD may only be arranged for providing a security-backup of the data. If the data of the solid state memory are defective or the solid state memory becomes broken, the data can be read from the HDD.

In another approach, storing data refers to erasing data only on the solid state memory, because it is not necessary to erase data before writing new data onto the HDD. As a result, the operating of the system is simplified.

In one embodiment, a cost-effective yet high-performing replication-based reliability method for solid state drives (SSDs), e.g., flash drives, uses one or more HDDs to store the replicated data pages stored on the solid state memory. The replicated data on the HDD(s) is managed, by the flash controller, in exactly the same way as data pages on the solid state memory. All read requests may be served by flash memory, and write requests may be served simultaneously at both the solid state memory and the HDDs in an append mode controlled by the solid state controller. This may be accomplished by virtually associating each physical solid state block with a physical chunk of disk space, which may be addressed by logical block addressing (LBA), and may use the solid state controller to manage data copies on both the solid state memory and the HDD. The advantages of this scheme are cost-effectiveness and higher throughput.

FIG. 1 depicts a schematic diagram of a first embodiment of a storage system 100 with a controller 1 that comprises a memory 2 and a processor 3. The memory may be solid state memory, such as flash, RAM, DRAM, etc., or any other fast access memory. The processor 3 may be a processor, a field programmable gate array (FPGA), an application specific integrated circuit (ASIC), etc. The controller 1 is coupled via an interface 4 with a solid state drive (SSD) 5 and hard disk drive (HDD) 6, both the SSD and HDD acting as computer readable memory. The SSD 5 may, for example, be embodied as a flash-type memory. In this case, the controller 1 is embodied as a flash-controller. The connection 4 may be embodied as connecting lines or a data bus that connects the controller 1 with the SSD 5 and HDD 6. The connection 4 to the SSD 5 and the HDD 6 may be based on different technologies. In this case, the connection 4 to the SSD 5 and the HDD 6 are separated. In the memory 2, programs are stored that are used by the processor to perform the function of the controller 1. The controller 1 comprises an input/output (I/O) 30 for exchanging data and control signals with a host computer. The HDD may comprise, as an example, a memory disk, a controller, and a buffer memory. Data and control signals are exchanged by an I/O interface. The details are not shown in the figure.

The SSD 5 is organized in data blocks which are used for storing data. For example, a solid state-memory page, such as a flash-memory page, may have a size of 4 KB and a solid state-memory block, such as a flash-memory block, may be made of 64 flash pages. Reading and writing operations may be performed on a page-basis while erasing operations are performed per block. This means that one reading operation always reads the data of a whole page. Also, during one writing operation the data of a whole page are always written. During one erasing operation, a whole block of data, comprising 64 memory-pages is always erased. Since erasing a block of data takes much longer than a page-read or a page-write, out-of-place writes are commonly used in solid state-memory to improve the write performance and to mitigate an even wear-out.

The HDD 6 may be organized into data segments 8. For each data block 7 of the SSD 5, a corresponding data segment 8, preferably of the same size, e.g., 256 KB, may be arranged. Furthermore, the data is stored in the same way in the data block 7 and in the data segment 8. The reading, writing, and erasing of data is performed by the controller 1, which possibly resides separately or together with the solid state-memory, and are performed, for example, in an appended mode. For example, a virtual association of each physical block 7 of the solid state-memory with a physical data segment 8 of the HDD may be used. For example, the data may be addressed by the method logical block addressing (LBA) and the controller 1 may be used to manage data copies on both the SSD and HDD. This means that each data is written in the SSD 5 and in the HDD 6. For example, each data segment 8 of the HDD is mapped to a data block 7 of the SSD 5. Therefore, the system and the method are cost-effective and provide a high throughput.

In order to perform out-of-place writes, the controller implements a set of functions such as host LA (logical address) to PA (physical solid state-address) mapping, such as flash translation layer FTL, garbage-collection, wear-labeling, and bad-block management which are similar to functions performed in a log-structured file system.

In one embodiment, the controller 1 always writes data sequentially on each free block on the SSD and at the same time, the controller issues disk write commands to the HDD and sends the same data to the HDD to write the data to the HDD. The controller maintains host LA-PA mapping in the memory 2 and a check point of host LA-PA map on both SSD and HDD using a dedicated area, for failure recovery reasons. Both SSD and HDD are used as multiple small block-sized logs, each having a size of 256 KB in case of a solid state block consisting of 64*4 KB pages, and append new data to the end of the log, while old data is invalidated. Note that the size of each block can be one solid state-block or multiple solid state-blocks. The controller may use garbage collection to identify suitable solid state-blocks to be relocated and erased. After all valid data blocks on the erase block have been written to a new location, the block may be erased and may be used as a free block to accommodate new writes. One approach is that every solid state-block which has a typical size of 256 KB is associated with one (or more) data segments of the disk LBA space, so that data on that solid state-block is replicated on its associated disk segment of the HDD. If a solid state-data page is moved, during garbage collection, from one solid state-block to another, it may also be written to a new corresponding location, e.g., to a corresponding new disk segment on the HDD.

Consequently, both SSD and HDD rely on the same controlling functions in the controller 1 to perform out-of-place writes and log-structured management, sharing the same host LA-PA map (e.g., FTL) and garbage collection functions. The benefit of doing out-of-place writes even on HDD is that a random write workload may be transformed into a sequential write one, which can accelerate disk write speed to match the speed of the SSD. In other words, disks are therefore mostly used in sequential mode to append write data, sustaining their peak transfer rates with minimal positioning overhead and potentially matching the high throughput of SSDs.

A write request is considered finished only if the data has been written successfully to both SSD and HDD. For all read-requests, the controller may read the data only from the SSD 5. In case of a failure of the SSD 5, the controller 1 will get the data from the HDD as there is always a copy of the data of the SSD on the HDD. In the case that the HDD fails, the controller will replicate data from SSD to another HDD. In case of a controller failure, another controller which performs the same functions may take over the control. This controller fail-over requires that all metadata used by the controller be stored safely (e.g., via check-point and logging) on both the SSD and HDD(s), so that the system can recover even from a controller failure.

In the embodiment shown in FIG. 1, the SSD 5 may have the same amount of storage space as one HDD 6. In a further embodiment, the SSD 5 uses less storage space than one HDD 6. The idea is to store both copies of data that are being accessed infrequently on the HDD only (preferably two copies on two different HDDs for reliability reasons) instead of one copy on the SSD and one copy on the HDD.

As a specific example, it is assumed that a SSD 5 has a storage space of 256 GB and a HDD has a storage page 512 GB. So, two SSDs and three HDDs could be used in a configuration that supports 1 TB of capacity as follows: each SSD has its own corresponding HDD. The third HDD is used for data being moved out of a SSD when garbage collection runs. Data on the third HDD is, therefore, data that is not frequently accessed, so there is still good overall performance for read/write requests. The above configuration may be further improved by splitting each HDD into two virtual sub-HDDs having ⅙ of the total HDD capacity, and distributing these chunks evenly over all HDDs, with the aim to guarantee that the two copies of infrequently accessed data is stored on different HDDs. Analogously, the splitting is not limited to this example, but may be done in a similar way with a similar aim for any HDD configuration.

The schemes disclosed herein that make use of a SSD, for example a flash memory, as a main memory for accessing data, and HDDs for replication, may be naturally extended. For instance, a controller together with a SSD may be used to serve read and write requests, and the same writes may also be served by a redundant array of independent disks (RAID) controller connected with multiple HDDs for data preservation reasons. The data stored on the HDDs will only be accessed for data recovery in this approach. The RAID controller may or may not use a log-structured management scheme to manage the replicated data on the HDDs. The controller might be arranged on the same card with solid state memory, but is not limited to that arrangement. In other words, the controller may also be a stand-alone module that may control data storage to the multiple HDDs and the SSD, in one approach.

Figure 2:
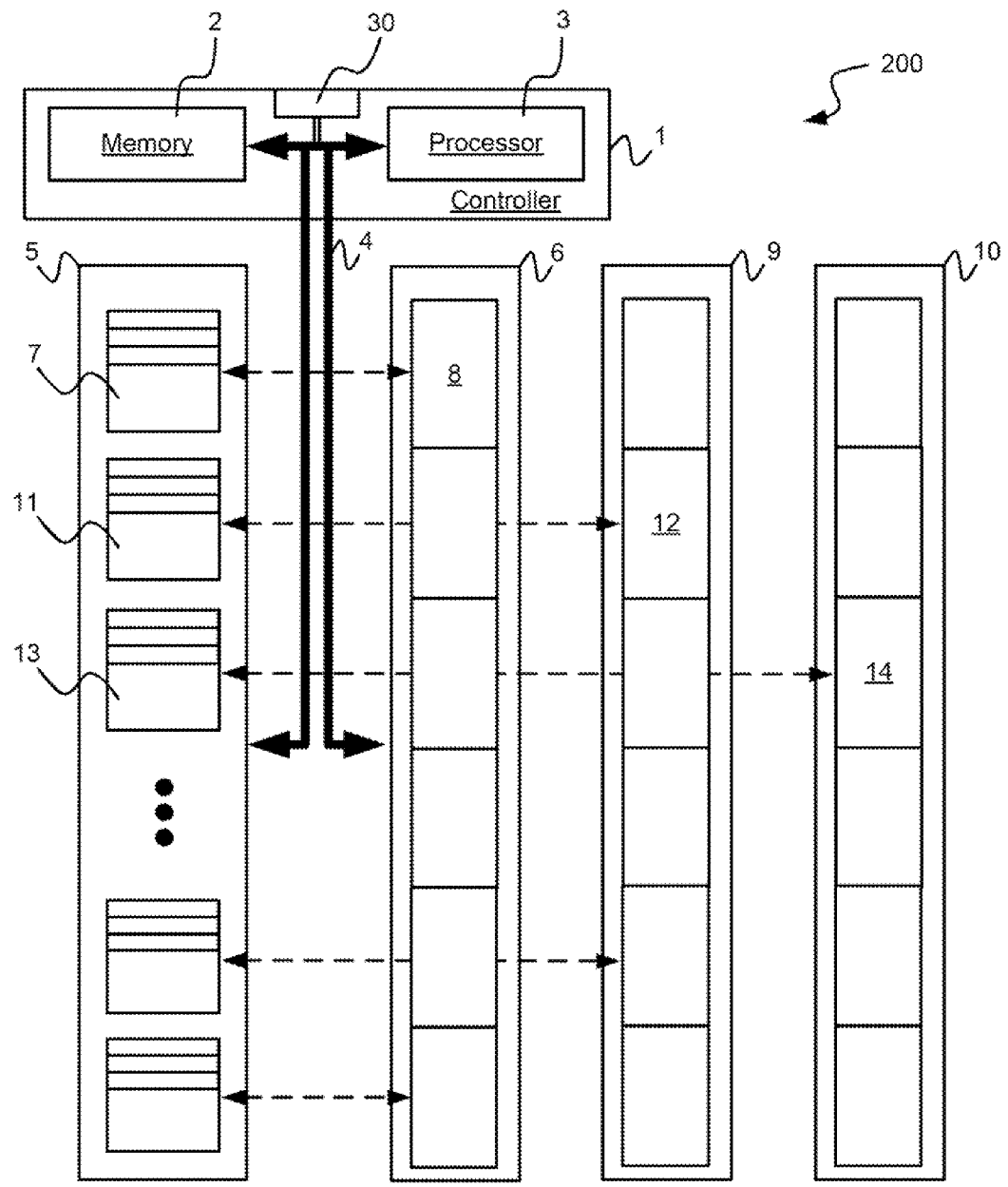
FIG. 2 depicts a second embodiment of a data storage system.

FIG. 2 shows a second embodiment of the storage system 200 that comprises a controller 1 with a memory 2 and a processor 3. The memory 2 and processor 3 may be of any type known in the art, as described previously. The controller 1 is coupled with a SSD memory 5 via a connection 4 and a first, second, and a third HDD memory 6, 9, 10. In this embodiment, three HDD storage devices are used, but any number greater than one may be used, in this or any other embodiment. The data blocks 7, 11, 13, of the SSD 5 are associated with data segments 8, 12, 14 of different HDDs 6, 9, 10. For example, the first data block 7 of the SSD 5 is associated with a first data segment 8 of the first HDD 6. The second data block 11 of the SSD 5 is associated with a second data segment 12 of the second HDD 9. A third data block 13 of the SSD 5 is associated with a third data segment 14 of the third HDD 10. This means that the data that are written in the different data blocks 7, 11, 13 of the SSD 5 are duplicated in several HDDs 6, 9, 10. Of course, the SSD may be any type of device that uses solid state memory, such as flash memory, in various embodiments.

Figure 3:
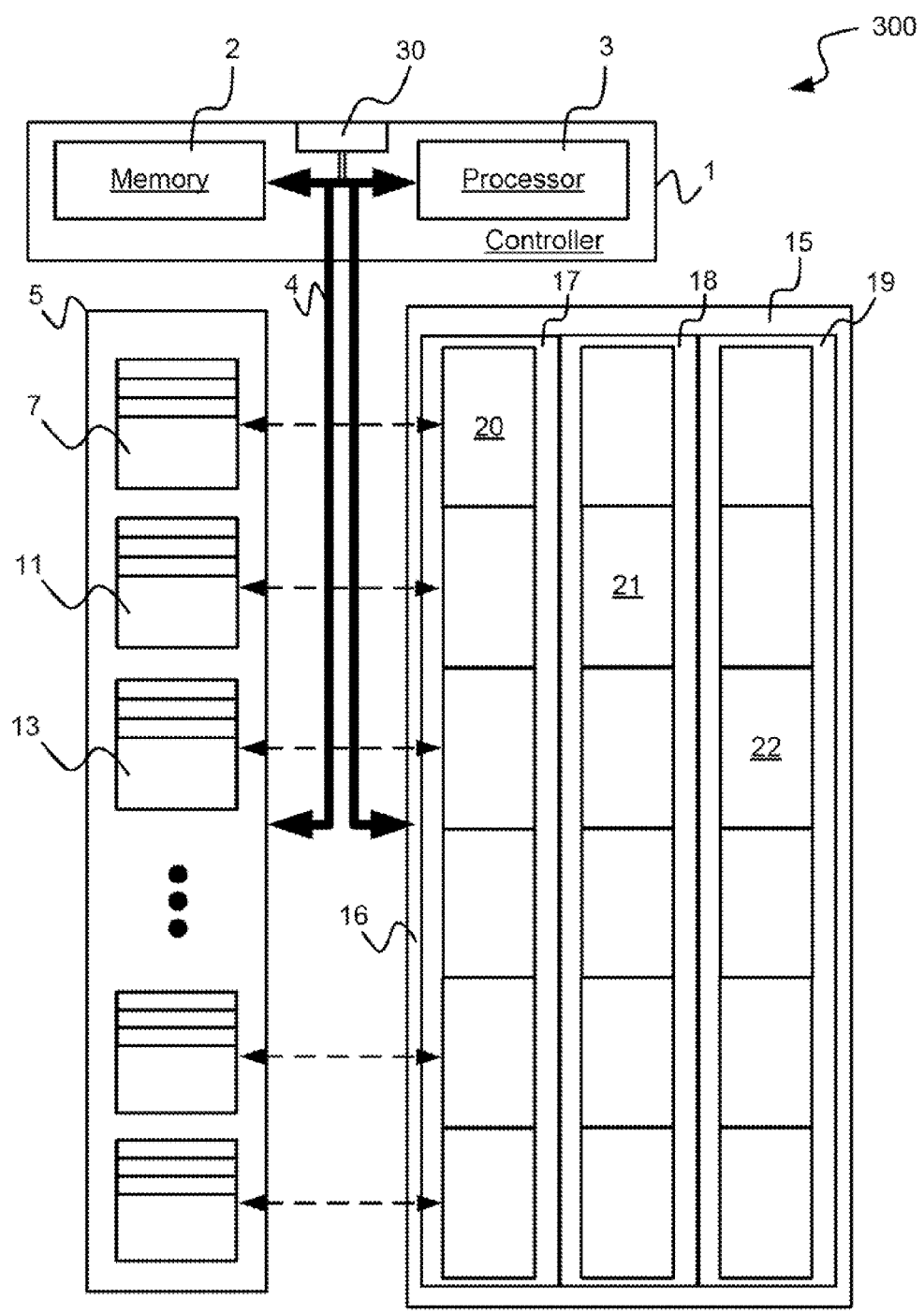
FIG. 3 depicts a third embodiment of a data storage system.

FIG. 3 shows a third embodiment of a storage system 300. This embodiment comprises the controller 1 with memory 2 and a processor 3. The memory 2 and processor 3 may be of any type known in the art, as previously described. Furthermore, the controller 1 is coupled with the SSD memory 5 via a connection 4 and a disk system 15. The disk system 15 comprises a second controller 16. The second controller 16 is embodied as a RAID controller that controls the data exchange between the controller 1 and several further HDDs 17, 18, 19. Again, in this embodiment, three HDDs are used, but any number greater than one may be used in this or any other embodiment.

In this embodiment, the data blocks 7, 11, 13 of the SSD 5 are associated with data segments 20, 21, 22 of at least one of the HDDs 17, 18, 19, and as shown in FIG. 3, they are spread across all three HDDs 17, 18, 19. The handling of the data for storing the data in the HDDs 17, 18, 19 is handed over from the controller 1 to the second controller 16.

Figure 4:
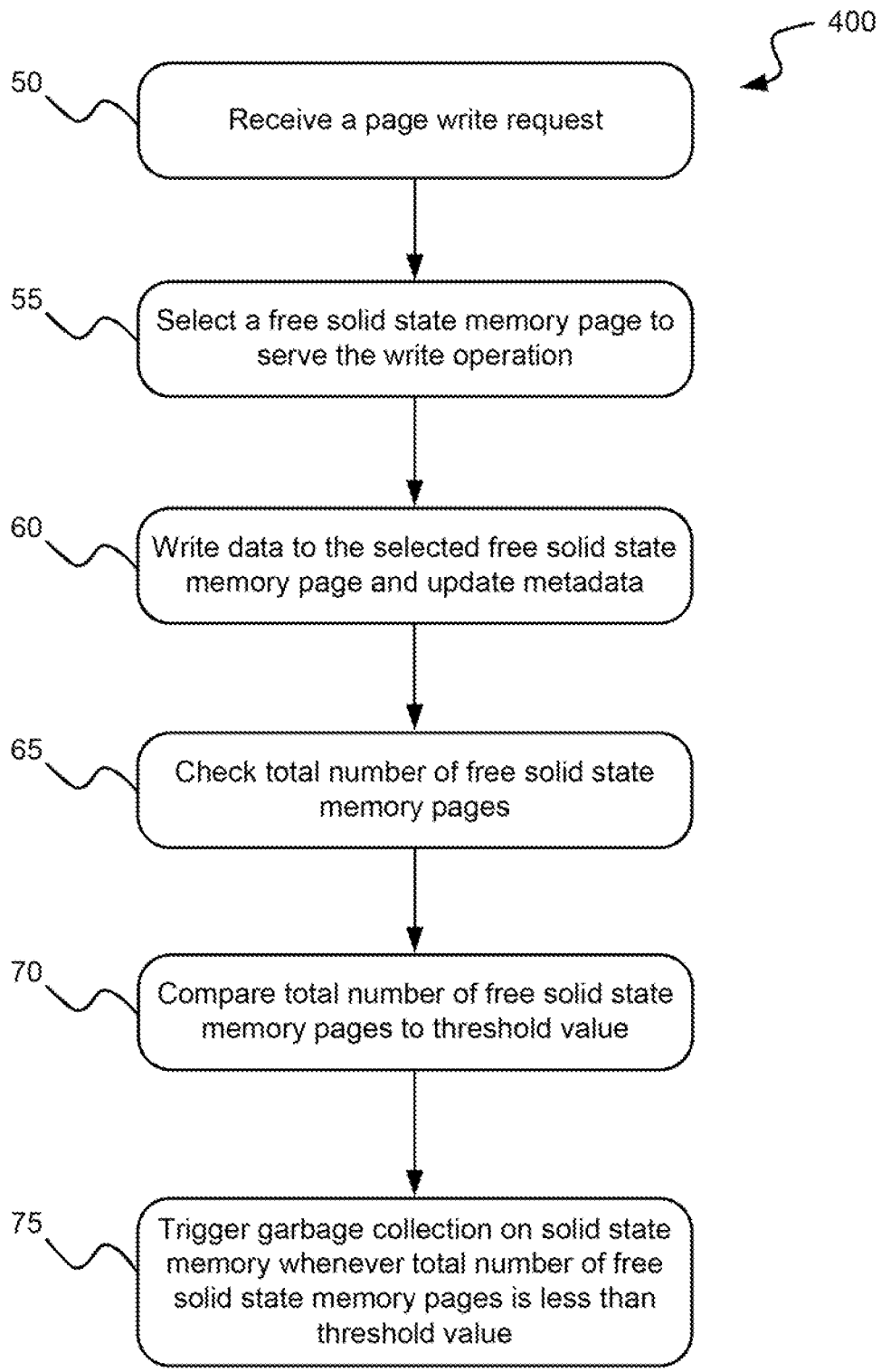
FIG. 4 depicts a flow chart of a writing process, according to one embodiment.

FIG. 4 shows a schematic flow chart of a method 400 for storing data in a data storage system, for example, according to the embodiment of FIG. 1. For example, the controller 1 may receive via an input/output (I/O) 30 that is connected with memory 2 and a processor 3, a request from a host computer to store data which is depicted, as shown in FIG. 4, in operation 50, according to one embodiment. Referring to FIGS. 1 and 4, the host computer delivers the data and a logical address for the data. In operation 55, the controller 1 searches for a free page of a data block 7 of the flash memory 5, according to one embodiment. In operation 60, the controller writes the data into the selected page of the flash memory 5 and updates metadata, according to one embodiment.

The logical address from the host computer is stored in the memory 2. A logical address of the flash controller for the stored data is also stored in the memory. A physical address of the selected page at which the data is stored is also stored in the memory. Metadata is a sort of control information which may be stored in the memory 2, the SSD 5, and in the HDD 6. The metadata is essential for deciding on the right policies and activities to the access to the flash memory. A simple example is the storing of the erase count of each of the blocks in the storage systems. As there is a desire to level out the usage of blocks across the storage system as blocks wear out with extended use, it is typical for a solid state memory system to maintain for each block a number of accumulated erase cycles and use these data for deciding on the next block to be allocated for writing new incoming data. Many of the metadata types commonly used are block-specific. The metadata provide some information that is a characteristic of the block as a whole. Furthermore, there may also be metadata types that are page-specific which means that they provide information related only to a specific page, and different pages within the same block may have different metadata values. One common example for page-specific metadata is the error-correction parity bit typically stored on each page of user data to enable error correction when reading the page. In case of power failures, the metadata may be stored to a SSD region dedicated for metadata, according to one embodiment.

In operation 65, the same data that were written into the flash memory 5 are now written into the HDD 6. A logical address of the segment of the HDD and the data is delivered from the controller 1 to the HDD 6. The controller stores a map that determines the assignment of the data blocks of the SSD 5 to determined disk segments of the HDD 6 in the memory 2. The data is, for example, written into a page of the HDD segment mirroring the solid state-block in which the same data were written before. For example, the addressing on the HDD 6 may be performed by using conventional logical block-addressing (LBA). The controller keeps a map table in the memory 2, according to one embodiment, from physical flash block address to disk logical block address, to record the association between a physical solid state-block and its disk copy on a HDD. The controller also implements a LA-PA mapping, such as flash translation layer (FTL), to keep track of the mappings of host logical address to solid state-physical address, enabling write-out-of-place. With the help of LA-PA mapping, incoming write requests may be served sequentially on individual solid state-blocks, therefore the writing on disks is sequential within HDD segments due to the one-to-one correspondence between a solid state-block and a HDD segment.

In operation 70, which is not necessary nor required in all cases, the controller checks if the total number of free solid state-pages of the SSD 5 is below a threshold. If this is the case, then the garbage-collection program is triggered on the SSD 5. Then the processing is stopped at operation 75.

If there is an embodiment as depicted in FIG. 3 with a disk system 15 comprising a second controller 16 that controls several HDDs 17, 18, 19, then the controller 3 delivers the data and the logical address of the data that have to be stored in the HDDs to the second controller 16. This means that, referring to the method depicted in FIG. 4, the writing of data in the HDDs in operation 65 is performed by the second controller 16.

The flow chart depicted in FIG. 4 is just one example of many embodiments possible using the techniques and systems described herein according to various embodiments. There may be many variations to this flow chart or the operations described therein without departing from the spirit and scope of the invention. For instance, the operations may be performed in a different order or operations may be added, deleted, or modified, or certain operations may be executed in parallel if the structure of the system allows for this. All of these variations are considered a part of the present invention.

The one-to-one map between SSD and HDD segment described above is based on the size of a single solid state-block. The map may naturally be done based on multiple solid state-blocks, meaning that one disk segment may be associated with a set of solid state-blocks, may be of the same size, and that data may be sequentially written to the set of solid state-blocks and the corresponding disk segment, respectively.

Figure 5:
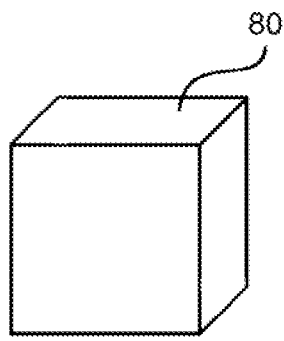
FIG. 5 depicts a computer program product, according to one embodiment.

FIG. 5 depicts a computer program product 80, for example embodied as a memory circuit, a DVD-ROM, a CD-ROM, a BD-ROM, etc., that is embodied in a computer-readable medium for causing a computer to control a method for storing data, as described above.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disk. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a non-transitory medium, such as a computer readable medium, for example, diskette, CD-ROM, DVD-ROM, BD-ROM, ROM, hard disk, etc., or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

Figure 6:
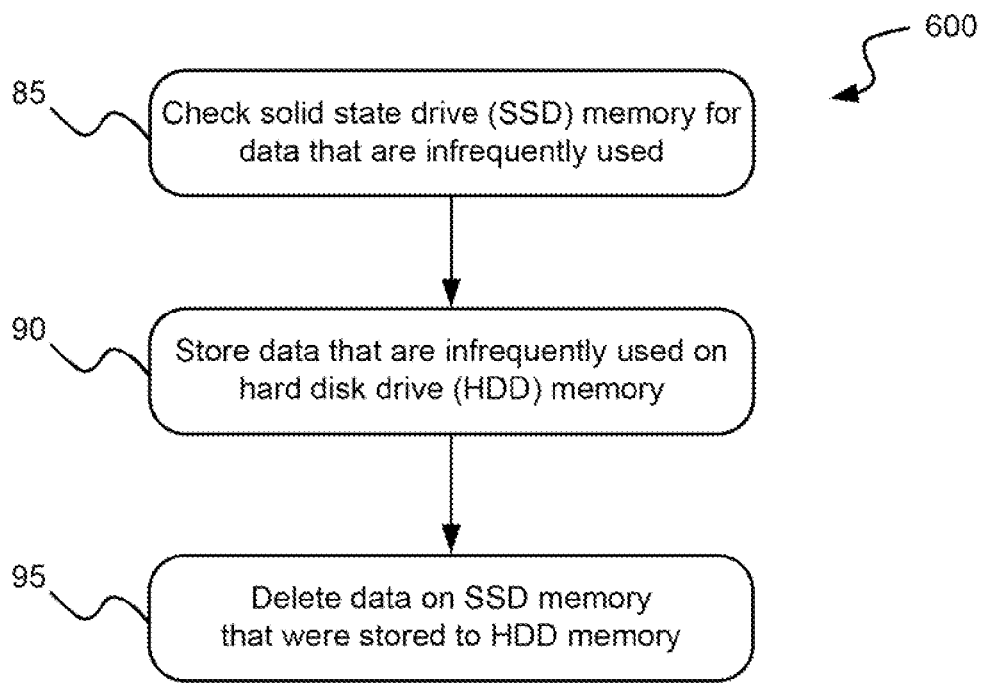
FIG. 6 depicts a flow chart of a method for storing infrequently used data on a hard disk drive, in one embodiment.

FIG. 6 shows a flow chart of a method 600 for storing data that are not frequently used, according to one embodiment. This method may be used for data read from the SSD and then stored to the HDD with a storage system as shown in FIG. 1, for example. The description of the method in FIG. 6 will now be made with reference to FIG. 1.

In operation 85, the controller 1 checks the SSD 5 for data that are used infrequently, which typically means that the data is infrequently read, but may also include data that were not recently written, regardless of last read. The controller may use a reference value for deciding which data is used frequently and which not. At operation 90, the controller 1 stores the infrequently used data of the SSD 5 to the HDD 6.

In operation 95, the controller 1 deletes the infrequently used data in the SSD 5. As a result, the infrequently used data is stored twice on the HDD 6 because the data were stored once on the HDD 6 when they were stored on the SSD 5 originally.

Figure 7:
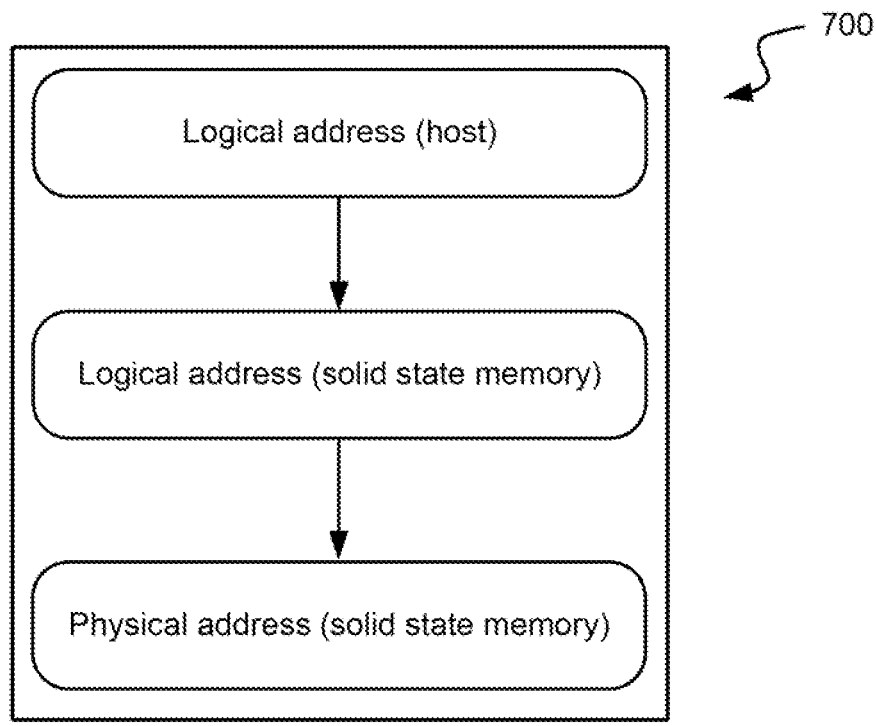
FIG. 7 depicts a first map, according to one embodiment.

FIG. 7 depicts a map 700 that may be used by a processor and that assigns a logical address of data that is received by the host computer to a logical address of data on a SSD. Furthermore, the logical address of the data on the SSD is assigned to a physical address of the SSD. The map is stored and updated on the memory of the system.

Figure 8:
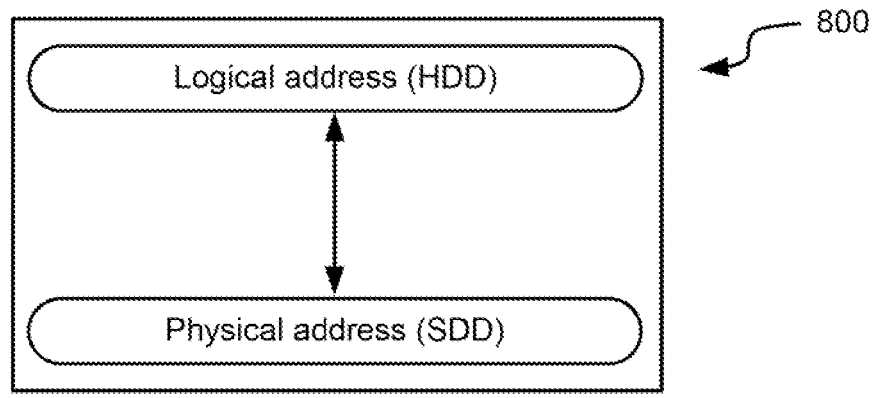
FIG. 8 depicts another map, according to one embodiment.

FIG. 8 depicts another map 800 that may be used by a processor controlling the storage of the data on a HDD. This map 800 shows the assignment of a physical address of data stored in a SSD and the logical address at which the same data is stored on the HDD. The physical address of the SSD may be a block address and/or a page address. The logical address of the HDD may be a physical disk segment address of the disk of the HDD. The map 800 may be stored and updated on the memory of the system.

Figure 9:
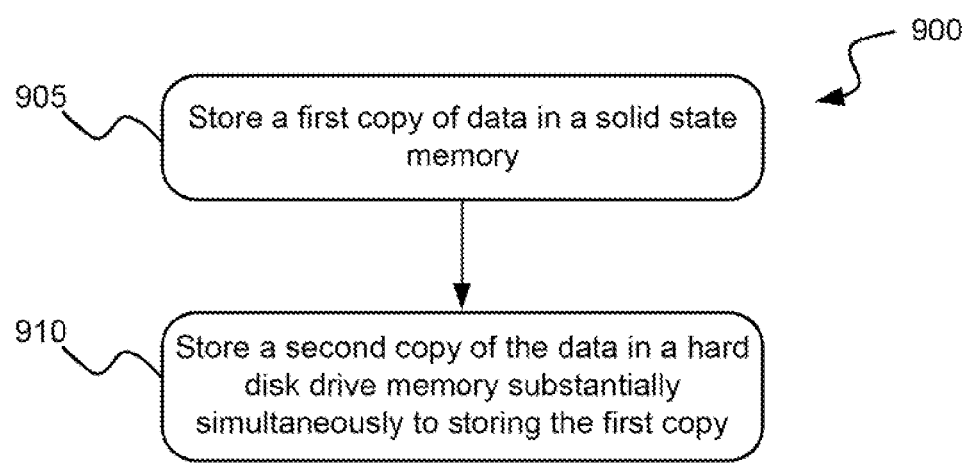
FIG. 9 shows a flowchart of a method, according to one embodiment.

Now referring to FIG. 9, a method 900 for storing data is shown according to one embodiment. The method 900 may be carried out in any desired environment, including those shown in FIGS. 1-8, among others, according to various embodiments.

In operation 905, a first copy of data is stored in a solid state memory. The solid state memory may be of any type known in the art, such as those described herein, among others, according to various embodiments.

In operation 910, a second copy of the data is stored in a hard disk drive memory, substantially simultaneously with the storing the first copy. Since solid state memory generally is capable of faster access times, even if operations 905 and 910 are performed simultaneously, the first copy typically will be written first, followed by the second copy, but the method 900 is not so limited. In some cases, the solid state memory may be busy or in some other way incapable of being accessed, in which case the second copy may be completely written to the HDD memory before the first copy is completely written to the solid state memory. Regardless, the storing operations in these cases are all considered to be "substantially simultaneously."

In one embodiment, a map may be used to store the data. The map may show a correlation between a physical solid state memory block address on the solid state memory and an assigned logical disk block address on the HDD memory that have the same data stored therein. In a further approach, a translation layer may be used to keep track of mappings of host logical addresses to solid state memory physical addresses.

According to one embodiment, storing the data may include writing the data in a solid state memory block and a disk segment of the HDD memory and associating the disk segment of the HDD memory with the solid state memory block. This association may be stored to the map, as previously described, or may be stored using any other technique known in the art such that it may be referenced to determine the association between the data stored in the solid state memory and the HDD memory.

In one embodiment, the method 900 may further include receiving a request to read the data and in response to receiving the request to read the data, the first copy of the data from the solid state memory may be read unless there is a failure of the solid state memory, in which case the second copy of the data may be read from the HDD memory.

According to yet another embodiment, the method 900 may further include receiving a request to erase the data and in response to receiving the request to erase the data, the first copy of the data may be erased from the solid state memory, with the proviso that the second copy of the data is not also erased from the HDD memory substantially concurrently with the erasure of the data from the solid state memory. Rather, the second copy may remain in the HDD memory until a request to erase the second copy is received, the second copy expires, after a predetermined time elapses, the storage location of the second copy is needed for other data, etc.

In one approach, the solid state memory and the HDD memory may be controlled by a controller of the solid state memory. In an alternate embodiment, the solid state memory and the HDD memory may be controlled by a controller of the HDD memory.

In a further embodiment, the controller may use a map to store the data. The map may be as previously described, or any other method as known in the art may be used to store the correlation between a physical solid state memory block address on the solid state memory and an assigned logical disk block address on the hard disk drive memory that have the same data stored therein.

In one embodiment, a system may include a solid state memory, at least one HDD memory, and a controller for controlling storage of data in the solid state memory and the HDD memory. In one approach, during normal operation of the system, reading operations may only be performed on the solid state memory, except during a failure of the solid state memory, when reading operations may be performed on the HDD memory.

In one approach, the system may include at least one more hard disk drive memory. In this approach, the controller may be a RAID controller that controls storage of data in the solid state memory and in all HDD memories, but is not so limited.

In one embodiment, less frequently accessed data may be stored on a first and a second hard disk drive memory, with the proviso that less frequently accessed data is not stored on the solid state memory. In a further embodiment, a garbage collection process may be used to determine whether data is frequently accessed or not.

According to one embodiment, a computer program product for storing data on a data storage system may include a computer readable storage medium having computer readable program code embodied therewith. The computer readable program code may have any of the functionality described herein, according to various embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method of storing data, the method comprising:
   storing a first copy of data in a solid state memory; and
   storing a second copy of the data in a hard disk drive memory substantially simultaneously with the storing the first copy.

2. The method as recited in claim 1, wherein a map is used to store the data, wherein the map shows a correlation between a physical solid state memory block address on the solid state memory and an assigned logical disk block address on the hard disk drive memory that have the same data stored therein.

3. The method as recited in claim 2, wherein a translation layer is used to keep track of mappings of host logical addresses to solid state memory physical addresses.

4. The method as recited in claim 1, wherein storing the data comprises:
simultaneously writing the data in a solid state memory block and a disk segment of the hard disk drive memory; and
associating the disk segment of the hard disk drive memory with the solid state memory block.

5. The method as recited in claim 1, further comprising:
receiving a request to read the data; and
in response to receiving the request to read the data, reading the first copy of the data from the solid state memory unless there is a failure of the solid state memory, in which case the second copy of the data is read from the hard disk drive memory.

6. The method as recited in claim 1, further comprising:
receiving a request to erase the data and
in response to receiving the request to erase the data, erasing the first copy of the data from the solid state memory, with the proviso that the second copy of the data is not also erased from the hard disk drive memory.

7. The method as recited in claim 1, wherein the solid state memory and the hard disk drive memory are controlled by a controller of the solid state memory.

8. The method as recited in claim 7, wherein the controller uses a map to store the data, wherein the map shows a correlation between a physical solid state memory block address on the solid state memory and an assigned logical disk block address on the hard disk drive memory that have the same data stored therein, and wherein the controller uses a translation layer to keep track of mappings of host logical addresses to solid state memory physical addresses.

9. The method as recited in claim 7, further comprising:
receiving a request to read the data and
in response to receiving the request to read the data, reading the first copy of the data from the solid state memory unless there is a failure of the solid state memory, in which case the second copy of the data is read from the hard disk drive memory.

10. The method as recited in claim 7, further comprising:
receiving a request to erase the data; and
in response to receiving the request to erase the data, erasing the first copy of the data from the solid state memory, with the proviso that the second copy of the data is not also erased from the hard disk drive memory.

11. A system for storing data, the system comprising:
a solid state memory;
at least one hard disk drive memory; and
a controller for controlling storage of data in the solid state memory and the hard disk drive memory, wherein a first copy of the data is stored in the solid state memory substantially simultaneously with storing a second copy of the data in the at least one hard disk drive memory.

12. The system as recited in claim 11, wherein the solid state memory comprises memory blocks, wherein the hard disk drive memory comprises disk segments each having a same size as each of the memory blocks, wherein a memory block of the solid state memory is assigned to a disk segment of the hard disk drive memory, and wherein data that is written in the memory block of the solid state memory is also written in the assigned disk segment of the hard disk drive memory.

13. The system as recited in claim 11, wherein the solid state memory and the hard disk drive memory are controlled by a controller of the solid state memory.

14. The system as recited in claim 11, further comprising at least one more hard disk drive memory, wherein the controller is a redundant array of independent disks (RAID) controller that controls storage of data in the solid state memory and in all hard disk drive memories.

15. The system as recited in claim 11, wherein less frequently accessed data is stored on a first and a second hard disk drive memory, with the proviso that less frequently accessed data is not stored on the solid state memory.

16. The system as recited in claim 15, wherein a garbage collection process is used to determine whether data is frequently accessed or not.

17. The system as recited in claim 11, wherein the controller uses a map to store data on the solid state memory and the hard disk drive memory, wherein the map shows a correlation between a physical solid state memory block address on the solid state memory and an assigned logical disk block address on the hard disk drive memory that have the same data stored therein, wherein the controller uses a translation layer to keep track of mappings of host logical addresses to solid state memory physical addresses.

18. The system as recited in claim 17, wherein reading operations are only performed on the solid state memory unless there is a failure of the solid state memory, in which case reading operations are performed on the hard disk drive memory, and wherein data is only erased from the solid state memory with the proviso that data is not erased from the hard disk drive memory substantially concurrently with the erasure of the data from the solid state memory.

19. A computer program product for storing data on a data storage system, the computer program product comprising a computer readable storage medium having computer readable program code embodied therewith, the computer readable program code comprising:
computer readable program code configured to store a first copy of data in a solid state memory; and
computer readable program code configured to store a second copy of the data in a hard disk drive memory simultaneously with the storing the first copy.

20. The computer program product as recited in claim 19, further comprising computer readable program code configured to read the first copy of data from the solid state memory unless there is a failure of the solid state memory, in which case the second copy of the data is read from the hard disk drive memory.

* * * * *